US010087899B2

(12) United States Patent
Tomlinson et al.

(10) Patent No.: US 10,087,899 B2
(45) Date of Patent: Oct. 2, 2018

(54) CHARGE MOTION CONTROL VALVE SEAL AND METHOD OF ASSEMBLY

(71) Applicant: Ford Global Technologies, LLC, Dearborn, MI (US)

(72) Inventors: Samuel Jeffrey Tomlinson, Farmington Hills, MI (US); Christopher Snow, New Boston, MI (US); Christopher William Newman, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 14/966,594

(22) Filed: Dec. 11, 2015

(65) Prior Publication Data

US 2017/0167451 A1 Jun. 15, 2017

(51) Int. Cl.
*F02M 29/00* (2006.01)
*F02M 35/104* (2006.01)
*F02M 35/10* (2006.01)

(52) U.S. Cl.
CPC .... *F02M 35/104* (2013.01); *F02M 35/10262* (2013.01); *F02M 35/10347* (2013.01); *F02M 35/10354* (2013.01)

(58) Field of Classification Search
CPC ........... F02M 35/104; F02M 35/10262; F02M 35/10347; F02M 35/10354
See application file for complete search history.

(56) References Cited

U.S. PATENT DOCUMENTS

| 5,715,782 A * | 2/1998 | Elder ............... B29C 45/0017 |
| | | 123/184.61 |
| 6,199,530 B1 * | 3/2001 | Brassell ................ F02B 27/00 |
| | | 123/184.34 |
| 8,056,534 B2 | 11/2011 | Magnan |
| 2007/0044787 A1 | 3/2007 | Brice |
| 2011/0304106 A1 | 12/2011 | Stickling |
| 2014/0230781 A1 | 8/2014 | Newman |

FOREIGN PATENT DOCUMENTS

| GB | 2515604 A | 12/2014 |
| JP | 2011-074760 A | 4/2011 |
| JP | 2014-227943 A | 12/2014 |
| WO | 2013/137349 A1 | 9/2013 |

* cited by examiner

*Primary Examiner* — Hung Q Nguyen
(74) *Attorney, Agent, or Firm* — Gregory P. Brown; Diana D. Brehob; Brehob Law, PLLC

(57) ABSTRACT

In an intake manifold that has charge-motion-control valves (CMCVs), a gap exists between the flapper valves and the wall of the intake runners. Although the gap is maintained as small as practical, it cannot be eliminated because manufacturing tolerances and temperature variations to which the intake manifold is subjected must be accommodated to prevent binding of the flapper valves. Some flow makes an end run through the gap leading to undesirable fluid mechanics. Disclosed herein is a seal that is positioned to rest gently upon the flapper valve near the gap such that the gap is substantially sealed off while applying a modest force on the CMCV so that the actuation torque is minimally impacted. The seal has a press-in-place portion inserted into a pocket formed in the manifold to hold it in place and a lip portion that extends out from the press-in-place portion to obstruct the gap.

18 Claims, 4 Drawing Sheets

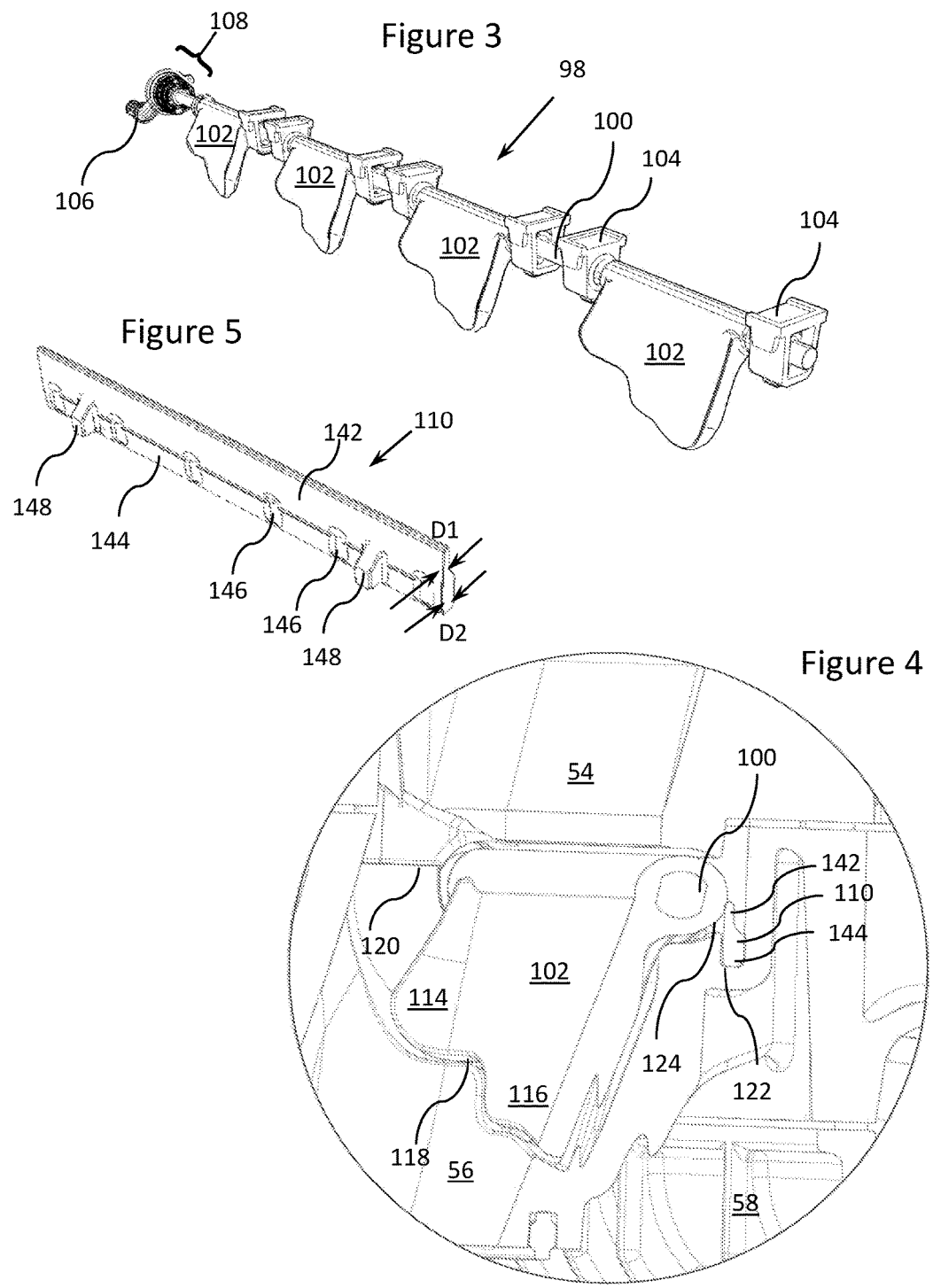

CHARGE MOTION CONTROL VALVE SEAL AND METHOD OF ASSEMBLY

FIELD

The present disclosure relates to charge motion control in the intake of internal combustion engines.

BACKGROUND

More than a quarter century ago, spark-ignition engines tended to have only one intake valve. To improve breathing and, thus, peak power obtainable from a given displacement engine, two intake valves became common in production engines. Two intake valves, though, have been found to give less mixture motion at low-torque conditions than a single intake valve causing a detriment to idle quality. If the cross-sectional area of the port is reduced at low-torque conditions, the velocity of the flow past such reduced area section is increased. Valves placed in ducts in the intake manifold can be maintained open at high-torque operating conditions, but moved to a blocking position at low-torque operating conditions. Additionally, the contours of the valves are carefully designed to encourage flow characteristic leading to tumble and/or swirl.

Charge motion control valves (CMCVs), such as that shown in commonly-assigned U.S. Pat. No. 8,056,534, are provided to block secondary intake ducts of an intake system in some engines. The CMCVs in U.S. Pat. No. 8,056,534 use a butterfly valve similar to a throttle valve used for controlling the quantity of air delivered to the engine. The actuator shaft of the CMCV passes through the center of the intake runner as well as through the center of the intake runners of the primary intake ducts. The CMCV shafts running through the center of the secondary intake runners interacts with flow at high-torque conditions causing a pressure drop and interfering with the fluid mechanics. Even more problematic is when the shaft passes through the primary ducts as well thereby negatively impacting flow in those ducts as well.

To overcome this problem, the butterfly valve has been replaced with a flapper valve that is connected to a shaft that passes through one edge of the duct. It has been found that some flow passes through the dud behind the flapper valve, i.e., a gap that is between the CMCV shaft and the edge of the duct proximate the CMCV shaft. Such a gap allows flow when the CMCV is intended to be closed thereby defeating some of the benefit of the CMCV and leading to undesirable effects on the fluid mechanics. Even when the CMCV is open, the flow through the gap negatively impacts the fluid mechanics.

In one prior art seal disclosed in WO2013/137349 A1, a centrally-located shaft has seals applied to tips of the butterfly valve. Such seals applied to the moving portion of the valve has a substantial effect only when the valve is closed or nearly closed. Such a seal does not solve the problem with sealing the undesired flow path when the valve is open. Furthermore, it would not solve the problem of flow behind the flapper valve in any valve position.

SUMMARY

To overcome at least one problem in the prior art, an intake manifold is disclosed that has a lower intake manifold section defining an intake runner, a rotatable shaft passing through the intake runner, a flapper valve coupled to the rotatable shaft, and a seal disposed between a side of the runner proximate the shaft and the flapper valve coupled to the shaft.

The intake manifold may include one or more of the following features. The seal has two portions: a press-in-place portion and a lip portion. The lower intake manifold portion defines a pocket into which the press-in-place portion of the seal is pressed. The press-in-place portion of the seal has at least one pilot tab extending outwardly from a surface of the press-in-place portion of the seal. The pocket has at least one notch defined therein. The pilot tab engages with the notch when the seal is installed in the pocket to thereby ensure that the seal is installed in the proper orientation. The thickness of the lip portion of the seal is less than the thickness of the press-in-place portion of the seal. The lip portion of the seal touches the flapper valve proximate where the shaft passes through the flapper valve. The press-in-place portion of the seals have retention ribs. The seal is fabricated of a flexible material. A tip of lip portion of the seal interferes with flapper valve proximate where the shaft passes through the flapper valve such that the lip portion of the seal bends and thereby presses against the flapper valve. The seal has two portions: a thicker portion and a thinner lip portion. The thicker portion engages with the lower intake manifold section. The lip portion presses against the flapper valve proximate where the shaft passes through the flapper valve.

Also disclosed is an intake manifold for an internal-combustion engine includes: a lower intake manifold section having a plurality of intake runners, one intake runner leading toward each cylinder of the engine, a rotatable shaft passing through at least two of the intake runners with the shaft being substantially perpendicular to the direction of flow in the runners, flapper valves coupled to the rotatable shaft with one flapper valve disposed in each of the at least two of the intake runners through with the rotatable shaft passes, and a seal provided behind each of the flapper valves in the at least two intake runners. Each seal has a portion that engages the lower intake manifold section and a portion that is biased against the flapper valve proximate where the shaft passes through the flapper valve. The lower intake manifold section defines a pocket associated with each of the at least two runners. The portion of the seal that engages with the lower intake manifold section has a plurality of retention ribs that extend outwardly from the seal and press against the pocket when installed. The portion of the seal that engages with the lower intake manifold section has at least one pilot tab extending outwardly from its surface. The pocket has at least one notch defined therein. The pilot tab engages with the notch when the seal is installed in the pocket to thereby ensure that the seal is installed in the proper orientation. A gap associated with each of the at least two intake runners exists between a wall of the intake runner and an end of the flapper valve through which the rotatable shaft passes. The portion of the seal biased against the flapper valve largely obstructs the gap. The lower intake manifold section is made of a material with a predetermined color; and the seals are made of a material that has a color that contrasts with the predetermined color. An upper intake manifold section is affixed to the lower intake manifold section. When the upper intake manifold section is affixed to the lower intake manifold section, the rotatable shaft with the flapper valves coupled to the rotatable shaft and the seals are captured in place.

Also disclosed is a method to fabricate an intake manifold, including: molding a lower intake manifold section has a plurality of intake ducts and a plurality of retention features each adapted to accept a portion of a seal, molding a plurality of seals; and engaging one of the seals into each of the retention features in the lower intake manifold. The method may further include assembling a charge-motion-control-valve (CMCV) assembly and securing the CMCV assembly in the lower intake manifold section. The CMCV assembly is placed into the lower intake manifold section after the seals are engaged with the retention features in the lower intake manifold section. The method may further include: molding an upper intake manifold section, placing the upper intake manifold section onto the lower intake manifold section, and welding the upper intake manifold section to the lower intake manifold section. In some embodiments, the lower manifold section is provided with at least one notch proximate each of the retention features for the seals, each seal has at least one pilot tab that protrudes outwardly from a side of the seal, and the pilot tabs of the seals engage with the notches. In other embodiments, the retention features are channels formed in a wall of the lower intake manifold section and the seals have a protruding member that engages with the channels. The method may further include molding an upper intake manifold section and affixing the upper intake manifold section to the lower intake manifold section. An open end of the channels in the lower intake manifold section is closed off when the upper intake manifold section is welded to the upper intake manifold section such that the seals are captured between the upper and lower intake manifold sections.

The seal prevents undesirable flow behind the flapper valve. By providing locating tabs on the seal, improper assembly is prevented. Retention ribs keep the seal in place once assembled. By making the lip portion of the seal of a thin, flexible material, the amount of pressure exerted by the lip portion on the flapper valve is great enough to substantially close off the gap, but small enough to increase actuation force to rotate the shaft, and hence the flapper valves, only minimally.

BRIEF DESCRIPTION OF THE DRAWINGS

FIG. 3 is an isometric representation of a CMCV shaft assembly;

FIG. 4 is a representation of a flapper valve coupled to a CMCV shaft and a flapper seal;

FIG. 5 is a representation of the flapper seal of FIG. 4;

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
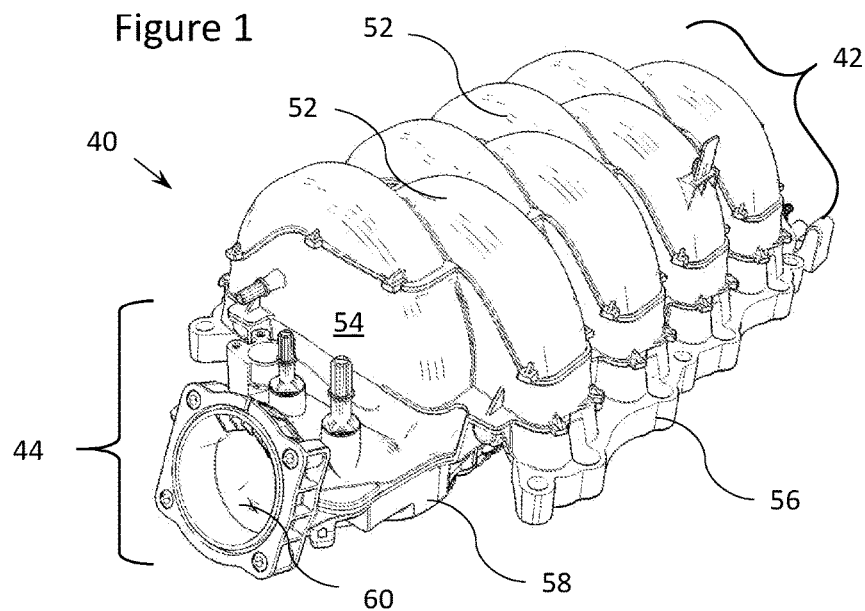
FIG. 1 is an isometric view of the intake manifold.

An intake manifold 40 is shown in FIG. 1. An upper manifold section 42 has a top shell 52 that is coupled to an upper midshell 54. Alternatively, top shell 52 and upper midshell 54 are integrally formed. A lower manifold 44 has a lower midshell 56 coupled to a plenum section 58. Alternatively, lower midshell 56 and plenum 58 are integrally formed. Intake manifold 40 has an inlet 60 to lower manifold 44 that may be coupled to the throttle body (not shown).

Figure 2:
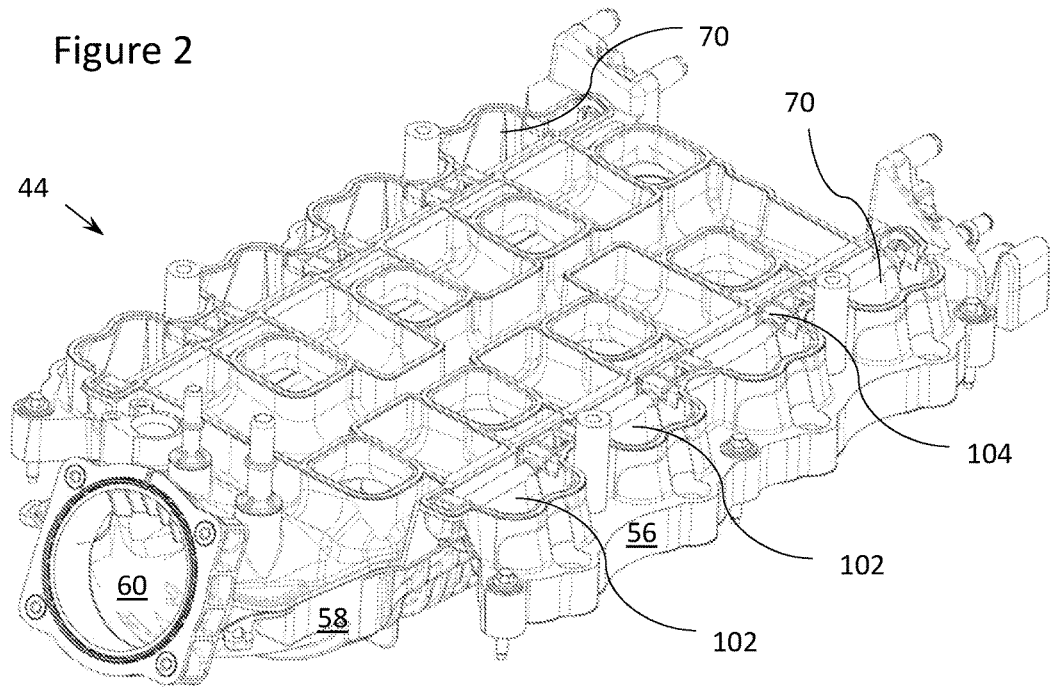
FIG. 2 is a portion of an intake manifold shown isomerically.

Lower manifold section 44 is shown in FIG. 2. A plurality of flapper valves 102 are provided in intake runners 70. Flapper valves 102 are shown in an open position in FIG. 2. When flipped upward, flapper valves 102 partially obstruct intake runners 70.

A CMCV assembly 98 is shown in FIG. 3. Bearing blocks are placed onto a shaft 100 after which flaps 102 are molded onto shaft 100. At end 106 of shaft 100 a vacuum actuator (not shown) is coupled; the vacuum actuator is capable of rotating shaft 100 to actuate CMCV assembly 98. Element 108 includes a clip, block rings, and a seal to prevent leaks and keep CMCV assembly 98 in position longitudinally when installed. Bearing blocks 104 clip into the lower manifold and hold CMCV assembly 98 in alignment when installed in the manifold.

In FIG. 4, a close up of a flapper valve 102 is shown as installed near an interface 120 between upper midshell 54 and lower midshell 56. Flapper valve 102 is molded onto shaft 100. A seal 110 is installed into a pocket 122 that is molded into lower midshell 56. Seal 110 has a lip portion 142 and a press-in-place portion 144. Lip portion 142 obstructs a gap 124 between flapper valve 102 and lower midshell 56. Gap 124 is in place to ensure that flapper valve 102 doesn't bind on midshell portion 56 in light of manufacturing tolerances and relative movement of the parts due to temperature extremes. Flapper valve 102 has a tip 116. Near curve 118, is a section that is cut out. Thus, when flapper valve 102 is in a position to obstruct flow, most of the flow passes through the cutout, near curve 118. Also flapper valve 102 has a curved section 114 to direct flow to provide the desired fluid mechanics in the cylinder.

Figure 6:
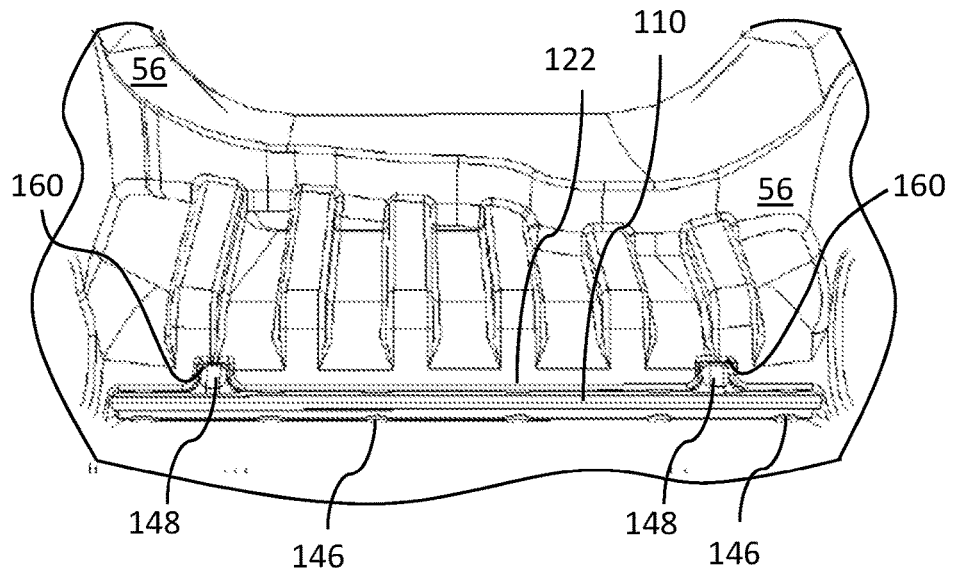
FIG. 6 is a view of the flapper seal of FIGS. 4 and 5, as installed in an intake manifold.

In FIG. 5, seal 110 is shown having a lip seal portion 142 that has a thickness D1 and a press-in-place (PIP) portion 144 that has a thickness D2. PIP portion 144 is the portion that presses into pocket 122 (shown in FIG. 4). PIP portion 144 has a plurality of retention ribs 146 that cause the seal to stay in place such as is known with PIP seals. Optionally, seal 110 further includes pilot tabs 148. Referring now to FIG. 6, tabs 148 on one side of seal no fit into notches 160 on one side of pocket 122. Seal 110 can only be installed in one direction. If it were flipped front to back, pilot tabs 148 interfere with pocket 122 thereby preventing improper installation. Pilot tabs 148 also constrain seal 110 from traveling out of groove 122 by a designed interference with flapper 102.

Figure 7:
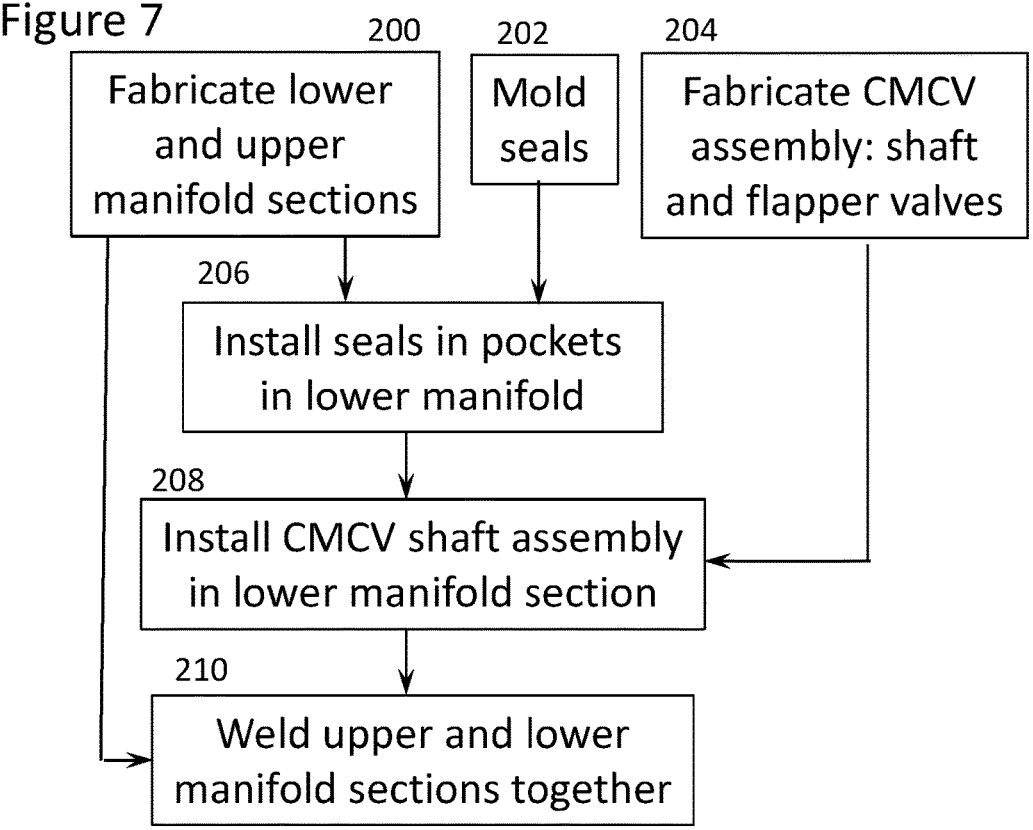
FIG. 7 is a flowchart of a method to assemble an intake manifold having a seal behind the flapper.

In FIG. 7, processes by which an intake manifold may be fabricated is shown. In block 200, the lower and upper intake manifold sections are formed by any suitable process, such as injection molding. Pocket 122 is molded within lower intake manifold section. Flexible seals are molded or fabricated in any suitable manner in block 202. The CMCV assembly is assembled in block 204. Seal members, clips, bearing blocks, and flapper valves are put on the shaft. In block 206, seals 110 that were fabricated in block 202 are pressed into pockets formed in the lower manifold section. In block 208, the CMCV shaft assembly fabricated in block 204 is placed in the lower manifold section. In some embodiments, seals 110 are set in place such that they cannot be removed. It is desirable to prevent seals 110 from being dislodged and allowed to be inducted into the engine. In some embodiments, bearing blocks are snapped into openings provided in the lower manifold section.

In block 210, the upper and lower intake manifold sections are brought together and welded. In some embodiments, the intake manifold sections are formed of a nylon material with raised beads that mate together. The beads are welded together via: friction welding, plate welding, or gas jet welding. Alternatively, the intake manifold sections are glued or affixed by another technique. When the intake manifold sections are affixed, the CMCV valve assembly is held in place.

In some embodiments, the seals are inserted into the lower intake manifold section by an operator. If the manifold is black and the seals are black, it provides minimal visual confirmation that all the seals have been installed. By forming the seals out of a contrasting color, the operator can readily view that the appropriate number of seals has been installed. Such a color contrast may be found to be useful for machine vision confirmation in an automated assembly process as well.

Figure 8:
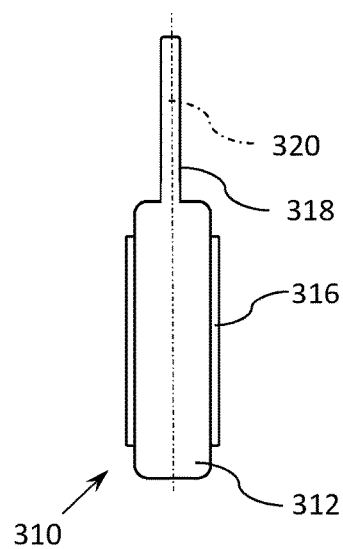
FIG. 8 is an illustration of an alternative flapper seal in which the lip portion is symmetrically arranged with respect to the press-in-place portion.

In FIG. 8 an alternative embodiment, a symmetrical seal 310, is shown in an end view. Seal 310 has a press-in-place portion 312 that is thicker than the lip portion 318. Retention ribs 316 are provided on the sides so that they interfere with the pocket into which press-in-place portion 312 is installed to prevent seal 310 from becoming dislodged. Seal 310 is symmetrical about a plane crossing through seal 310 as represented by line 320. In some intake manifolds, symmetrical seal 310 can be accommodated. Seal 310 of FIG. 9 obviates pilot tabs 148 that are provided on seal 110, shown in FIG. 4.

Figure 9:
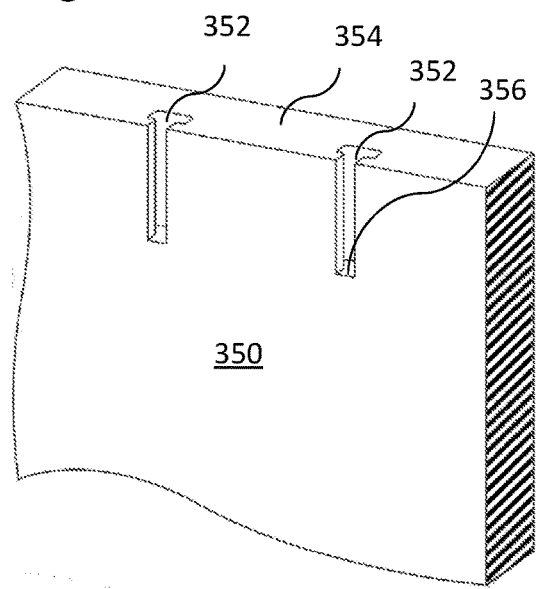
FIGS. 9-11 are illustrations of an alternative flapper seal that engages in channels in the manifold.
Figure 10:
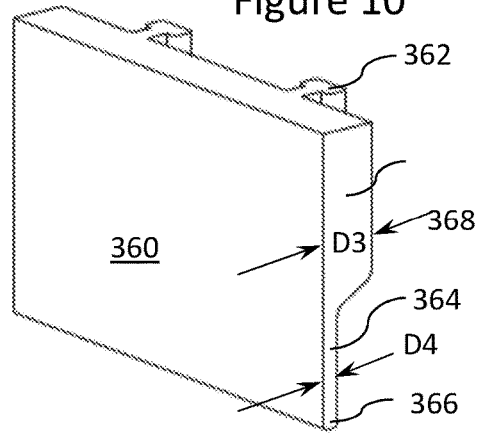
Figure 11:
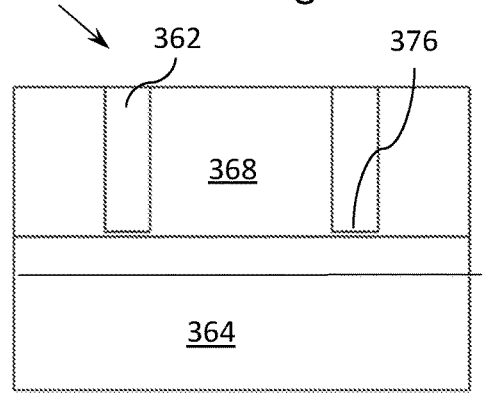

In the embodiment shown in FIG. 5, lip portion 142 of seal 110 extends upwardly from PIP portion 144. However, in an alternative embodiment, a seal may extend downwardly and be installed in the lower midshell or in the upper midshell. One such alternative is shown in FIGS. 9-11. A portion of a lower midshell 350 has reentrant channels 352 that extend from a top surface 354 to bottoms 356 of channels 352. Channels 352 are open at the top of lower midshell 350. A seal 360 is shown in FIG. 9 that has mating ribs 362 for insertion into channels 352. Seal 360 is made of a flexible material that has a portion that has a thickness D3 that provides stability to seal 360 and a lip portion 364 of thickness D4 that is biased against the flapper valve (not shown in FIGS. 9-11) with a slight amount of force: enough to maintain contact with the flapper valve to obstruct the gap, but small enough so that the actuation force is, at most, marginally impacted. Tip 366 of seal 360 may ride on the flapper valve as it moves in response to rotation of the shaft. Another view of seal 360 is shown in FIG. 11 showing that ribs 362 extend down a portion of seal 360. Tips 376 of ribs 362 abut bottom ends 356 of channels 352 (shown in FIG. 9) when installed. When the upper intake manifold section is coupled to the lower intake manifold section, ribs 362 are captured thereby capturing seal 360 to prevent it from being dislodged.

The terms lower intake manifold section and upper intake manifold section are used. Herein, although upper and lower are used as identifiers of the two sections, such terms are not intended to be limiting and could refer to any orientation.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An intake manifold, comprising:
   a lower intake manifold section defining an intake runner and a pocket;
   a rotatable shaft passing through the intake runner;
   a flapper valve coupled to the rotatable shaft; and
   a seal disposed between a side of the runner proximate the shaft and the flapper valve coupled to the shaft wherein the seal has a press-in portion having retention ribs; and the press-in portion is pressed into the pocket.

2. The intake manifold of claim 1 wherein:
   the seal has two portions: the press in portion and a lip portion.

3. The intake manifold of claim 2 wherein:
   the press-in-place portion of the seal has at least one pilot tab extending outwardly from a surface of the press-in-place portion of the seal;
   the pocket has at least one notch defined therein; and
   the pilot tab engages with the notch when the seal is installed in the pocket to thereby ensure that the seal is installed in the proper orientation.

4. The intake manifold of claim 2 wherein the thickness of the lip portion of the seal is less than the thickness of the press-in-place portion of the seal.

5. The intake manifold of claim 2 wherein the lip portion of the seal touches the flapper valve proximate where the shaft passes through the flapper valve.

6. The intake manifold of claim 2 wherein:
   the seal is fabricated of a flexible material; and
   a tip of the lip portion of the seal interferes with flapper valve proximate where the shaft passes through the flapper valve such that the lip portion of the seal bends and thereby presses against the flapper valve.

7. The intake manifold of claim 1 wherein:
   the seal has two portions: a thicker portion and a thinner lip portion;
   the thicker portion engages with the lower intake manifold section; and
   the lip portion presses against the flapper valve proximate where the shaft passes through the flapper valve.

8. An intake manifold for an internal-combustion engine, comprising:
   a lower intake manifold section having a plurality of intake runners, one intake runner leading toward each cylinder of the engine;

a rotatable shaft passing through at least two of the intake runners with the shaft being substantially perpendicular to the direction of flow in the runners;

flapper valves coupled to the rotatable shaft with one flapper valve disposed in each of the at least two of the intake runners through with the rotatable shaft passes; and a seal provided behind each of the flapper valves in the at least two intake runners wherein each seal has a portion that engages the lower intake manifold section and a portion that is biased against the flapper valve proximate where the shaft passes through the flapper valve.

9. The intake manifold of claim 8 wherein:
the lower intake manifold section defines a pocket associated with each of the at least two runners; and
the portion of the seal that engages with the lower intake manifold section has a plurality of retention ribs that extend outwardly from the seal and press against the pocket when installed.

10. The intake manifold of claim 9 wherein:
the portion of the seal that engages with the lower intake manifold section has at least one pilot tab extending outwardly from its surface;
the pocket has at least one notch defined therein; and
the pilot tab engages with the notch when the seal is installed in the pocket to thereby ensure that the seal is installed in the proper orientation.

11. The intake manifold of claim 8 wherein:
a gap associated with each of the at least two intake runners exists between a wall of the intake runner and an end of the flapper valve through which the rotatable shaft passes; and
the portion of the seal biased against the flapper valve largely obstructs the gap.

12. The intake manifold of claim 8 wherein:
the lower intake manifold section is made of a material with a predetermined color; and
the seals are made of a material that has a color that contrasts with the predetermined color.

13. The intake manifold of claim 8, further comprising:
an upper intake manifold section affixed to the lower intake manifold section wherein when the upper intake manifold section is affixed to the lower intake manifold section, the rotatable shaft with the flapper valves coupled to the rotatable shaft and the seals are captured in place.

14. An intake manifold, comprising:
a molded lower intake manifold section having: a plurality of intake ducts; and a plurality of retention features each adapted to accept a portion of a seal;
a plurality of molded seals with the seals engaged into the retention features in the lower intake manifold wherein:
the lower manifold section is provided with at least one notch proximate each of the retention features for the seals;
each seal has at least one pilot tab that protrudes outwardly from a side of the seal; and
the pilot tabs of the seals engage with the notches.

15. The intake manifold of claim 14, further comprising:
a charge-motion-control valve assembly that is secured into the lower intake manifold section.

16. The intake manifold of claim 15 wherein the CMCV assembly is secured into the lower intake manifold section after the seals are engaged with the retention features in the lower intake manifold section.

17. The intake manifold of claim 15, further comprising:
a molded upper intake manifold section that is welded onto the lower upper intake manifold section.

18. The intake manifold of claim 14, wherein:
the retention features are channels formed in a wall of the lower intake manifold section; and
the seals have a protruding member that engages with the channels, the intake manifold further comprising:
a molded upper intake manifold section affixed to the lower intake manifold section wherein an open end of the channels in the lower intake manifold section is closed off when the upper intake manifold section is welded to the lower intake manifold section such that the seals are captured between the upper and lower intake manifold sections.

* * * * *